US009654347B2

(12) United States Patent
Masera (10) Patent No.: US 9,654,347 B2
(45) Date of Patent: May 16, 2017

(54) CONFIGURING METHOD AND DEVICE RELYING ON MANAGEMENT RULES (75) Inventor: Eric Masera, Rueil Malmaison (FR)

(73) Assignee: Sagemcom Broadband Sas, Rueil Malmaison (FR)

( * ) Notice: Subject to any disclaimer, the term of this patent is extended or adjusted under 35 U.S.C. 154(b) by 496 days.

(21) Appl. No.: 14/006,141

(22) PCT Filed: Feb. 15, 2012

(86) PCT No.: PCT/EP2012/052600
§ 371 (c)(1),
(2), (4) Date: Nov. 25, 2013

(87) PCT Pub. No.: WO2012/126679
PCT Pub. Date: Sep. 27, 2012

(65) Prior Publication Data
US 2014/0075321 A1 Mar. 13, 2014

(30) Foreign Application Priority Data
Mar. 22, 2011 (FR) ..................................... 11 52337

(51) Int. Cl.
G06F 3/048 (2013.01)
H04L 12/24 (2006.01)
H04L 12/28 (2006.01)

(52) U.S. Cl.
CPC ............ *H04L 41/22* (2013.01); *H04L 12/281* (2013.01); *H04L 12/2809* (2013.01); *H04L 41/022* (2013.01); *H04L 41/0816* (2013.01); *H04L 41/0893* (2013.01)

(58) Field of Classification Search
None
See application file for complete search history.

(56) References Cited

U.S. PATENT DOCUMENTS

2003/0217136 A1  11/2003  Cho et al.
2010/0256781 A1*  10/2010  Sheu ................................ 700/3
2012/0117503 A1*  5/2012  Hofrichter ......... G06Q 30/0251
                                                         715/772

FOREIGN PATENT DOCUMENTS

EP           0273447 A1    6/2009

* cited by examiner

Primary Examiner — William Trapanese
(74) Attorney, Agent, or Firm — Bachman & LaPointe, P.C.

(57) ABSTRACT

A system has a rules engine for applying rules for managing appliances in the system. Each rule defines at least one action to be executed when at least one condition is fulfilled. To define a rule, a configuring device is used for: obtaining for each appliance descriptions of possible states and executable functions; transcribing the descriptions as semantic expressions; supplying the semantic expressions to a user interface; enabling a user, via the user interface, to define at least one rule from at least one condition, on the basis of the semantic expressions of states, and at least one action, on the basis of the semantic expressions of functions; and transcribing each management rule, defined semantically via the user interface, as instructions interpretable by the rules engine.

14 Claims, 4 Drawing Sheets

CONFIGURING METHOD AND DEVICE RELYING ON MANAGEMENT RULES

BACKGROUND

The present invention concerns configuring for the management, meaning the monitoring and control, of apparatus in a system on the basis of management rules defining at least one action to be executed by said system when at least one condition is fulfilled.

Consumer electronics appliances having a network interface and home automation appliances remotely controllable are becoming more and more common. This enables offering novel services to the users, in particular in a dwelling or business premises. A management system, meaning for monitoring and control, can therefore be established so as to manage these novel services.

Such a management system is capable of detecting appliances present in its environment and recovering a description thereof. It is for example possible to use the UPnP (Universal Plug and Play) standard as defined in the ISO/IEC document 29341-1: 2008. In this standard, it is in particular possible to use the SSDP (Simple Service Discovery Protocol) for discovering appliances present in the environment of the management system. Thus, according to the UPnP protocol, an appliance indicates its presence by means of a message of the SDDP NOTIFY type. The control point of the system then transmits a request of the HTTP GET type and obtains in response, to the XML (eXtended Markup Language) format, a description of the states in which the appliance may be and functions that it is able to execute.

A similar result can be obtained with other communication technologies and according to other discovery and command protocols, such as for example the ZigBee (registered trademark) technology, based on the IEEE 802.15.4 specifications for Wireless Medium Access Control and physical layer for low rate wireless personal area networks (LR-WPAN).

The management system can be configured by means of management rules, also referred to as business rules. These management rules are defined by at least one condition and at least one action. Thus, when the condition of the management rule is fulfilled, the system implements the associated action, by means of a rules engine (business rules engine). The purpose of such a rules engine is to separate the business logic, that is to say the scenarios to be implemented, from the system logic. Thus the business logic may change and be kept separate from the application programming itself.

Thus, thanks to the definition of management rules and the use of the rules engine, a user is able to customize the behaviour of his system managing the appliances available to him, for example with regard to home automation or multimedia services.

However, defining these management rules requires technical skills so as to interpret the events and messages generated in the management system and to program the rules engine suitably. It is then tricky, or even impossible, without assistance to a user without these technical skills to define new management rules and thus customize his environment as he wishes. The management systems of the prior art thus lack flexibility, because of this limitation related to the technical skills required for programming rules engines and interpreting the generated events and messages.

SUMMARY OF THE INVENTION

It is desirable to overcome these various drawbacks of the prior art.

It is in particular desirable to provide a solution that enables a configuration for managing appliances in a system on the basis of management rules, in a simple manner not requiring any skills related to the programming of rules engines and the interpretation of events or messages generated in the system.

The invention concerns a configuring method for managing appliances in a system on the basis of management rules defining at least one action to be executed by said system when at least one condition is fulfilled, said system comprising a rules engine intended to implement said management rules. The method is such that a configuring device obtains a description of states in which each appliance in the system may be situated, and obtains a description of functions that each appliance in the system is able to execute. The method is also such that the configuring device: transcribes said descriptions of the states and functions into respective semantic expressions; supplies said semantic expressions of the states and functions to a user interface; enables a user, via the user interface, to define at least one management rule from at least one condition, on the basis of the semantic expressions of states, and at least one action, on the basis of the semantic expressions or functions; and transcribes each management rule, defined semantically via the user interface, into instructions interpretable by the rules engine.

Thus, thanks to the semantic transcription of the states and actions, the user can define management rules, in a simple manner not requiring any skills related to the programming of rules engines, nor the interpretation of events or messages generated in the system. This is because this semantic approach via the user interface enables the user to use a natural language for understanding the possible states and functions in the system and enables him to define just as naturally the management rules to be applied by the system.

According to a particular embodiment, when a state or function is associated with at least one attribute that may take various values, the configuring device transcribes the description of the state or function into semantic expressions according to said various values.

Thus the technical character of the programming of the rules engine is even more hidden.

According to a particular embodiment, the configuring device transcribes said descriptions of the states and functions into semantic expressions in a predetermined language from a choice of several languages available via the user interface.

Thus the definition of the management rules is all the more natural for the user.

According to a particular embodiment, the configuring device transcribes said descriptions of the states and functions into semantic expressions by using at least one matching dictionary between, for each apparatus according to its type, each state or function and a corresponding semantic expression.

Thus the transcription into semantic expressions is implemented simply and rapidly.

According to a particular embodiment, the configuring device enables the user, via the user interface, to define at least one management rule condition on the basis of a time stamping event or an event of activation of a user profile with said system.

Thus a larger panel of conditions is offered to the user.

According to a particular embodiment, the configuring device enables broadcasting, via the user interface, a management rule in the course of definition, and the configuring device enables broadcasting, via the user interface, for each apparatus to which a defined condition or action relates, a semantic expression corresponding to a name of said apparatus associated with a semantic expression corresponding to a word representing the state or function to which respectively said defined condition or action relates.

Thus, by broadcasting, such as for example displaying, portions of a sentence thanks to the names of apparatus and the words representing the states and functions thereof, the definition of the management rules is all the more natural for the user.

According to a particular embodiment, the configuring device allows the automatic insertion, for the display of the management rule currently being defined, of semantic linking expressions on the basis of each defined condition or action.

Thus, thanks to the introduction of these semantic linking expressions, a broadcasting of the management rule currently being defined is done in the form of a sentence, and the definition of the management rules is all the more natural for the user.

According to a particular embodiment, the configuring device enables, via the user interface, selecting several appliances, and enables associating a condition or action with the selected appliances.

Thus, the definition of certain management rules may be accelerated and facilitated.

According to a particular embodiment, the user interface being a graphical interface, the configuring device allows, via the graphical interface, displaying representations of said appliances by groups established according to a geographical distribution of said appliances and/or according to services provided by said appliances.

Thus, the definition of the management rules is facilitated.

According to a particular embodiment, the configuring device receives descriptions of states and functions of the appliances according to various protocols using various formats, and transcribes in a same format the received descriptions in order to obtain said descriptions of the states and functions.

Thus, it is possible to make the management of the various types of appliances converge in the same system, transparently for the user defining the management rules.

The invention also concerns a configuring device for managing appliances in a system on the basis of management rules defining at least one action to be executed by said system when at least one condition is fulfilled, said system comprising a rules engine intended to implement each of said management rules. The configuring device is such that it comprises: means for obtaining a description of states in which each appliance in the system is able to be, and means for obtaining a description of functions that each appliance in the system is able to execute. The configuring device is also such that it comprises: means for transcribing said descriptions of the states and functions into respective semantic expressions; means for supplying said semantic expressions of the states and actions to a user interface; means for enabling a user, via the user interface, to define at least one management rule from at least one condition, on the basis of the semantic expressions of states, and at least one action, on the basis of the semantic expressions of functions; and means for transcribing each management rule, defined semantically via the user interface, into instructions interpretable by the rules engine.

The invention also concerns a graphical interface for defining management rules for managing appliances in a system, each management rule defining at least one action to be executed by said system when at least one condition is fulfilled. The graphical interface is such that it comprises: a first display zone intended to display representations of said appliances and to enable a user to select at least one of said appliances; a second display zone intended to display semantic expressions representing respective states in which at least one selected appliance is able to be and to enable a user to make a selection; a third display zone intended to display semantic expressions representing functions that at least one selected appliance is able to execute; and a fourth display zone intended to display a management rule currently being defined. The graphical interface is also such that said second and third display zones are adapted to enable a user to define at least one management rule from at least one condition, on the basis of the semantic expressions of states displayed in the first display zone, and at least one action, on the basis of the semantic expressions of functions displayed in the second display zone.

The invention also concerns a computer program intended to be read by a computer system or a processor. This computer program comprises instructions for implementing the method mentioned above, in any of its various embodiments, when said program is executed by a computer system or a processor. The invention also concerns storage means comprising such a computer program.

BRIEF DESCRIPTION OF THE DRAWINGS

The features of the invention mentioned above, as well as others, will emerge clearly from a reading of the following description of an example embodiment, said description being given in relation to the accompanying drawings, among which.

DETAILED DESCRIPTION

Figure 1:
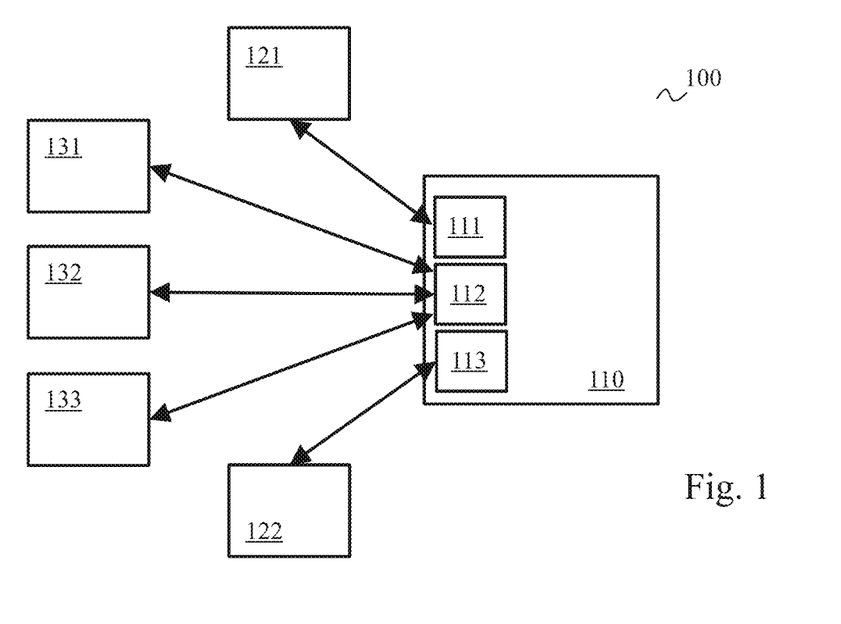
FIG. 1 schematically illustrates an appliance management system in which the invention can be implemented.

FIG. 1 schematically illustrates an appliance management system 100 in which the invention may be implemented.

The system 100 enables appliances to be managed in a given environment. For example, this example is the domestic environment of private individuals, but may also be any other type of environment, such as a business environment.

According to a first example, the system 100 manages appliances suitable for home automation, such as lamps, blinds or heating appliances, etc., which a control unit 110 of the system 100 can remotely control and monitor. According to a second example, the system 100 manages appliances supplying multimedia services, such as a digital recorder, a decoding box (set-top box), video cameras, etc., which can also be remotely controlled and monitored by the control unit 110.

Thus the system 100 enables the management of appliances that may be in various states, depending on whether the functions that they offer are actually activated or not. Taking the example of home automation, an appliance of the lamp type may be in an "on" state or "off" state and provides the functions of activation or deactivation of illumination. Some appliances, through the large number of functions that they offer, are able to be in a much high number of states.

The control unit 110 comprises a plurality of interfaces 111, 112, 113, relying on communication technologies, whether they be wireless or wired. The interfaces 111, 112, 113 enable the control unit 110 to communicate with appliances according to various protocols and/or rely on various communication media. The control unit 110 is thus connected to an appliance 121 via the interface 111, to appliances 131, 132, 133 via the interface 112 and to an appliance 122 via the interface 113.

As detailed hereafter, the control unit 110 enables applying, in the system 100, management rules defined by the user.

Figure 2:
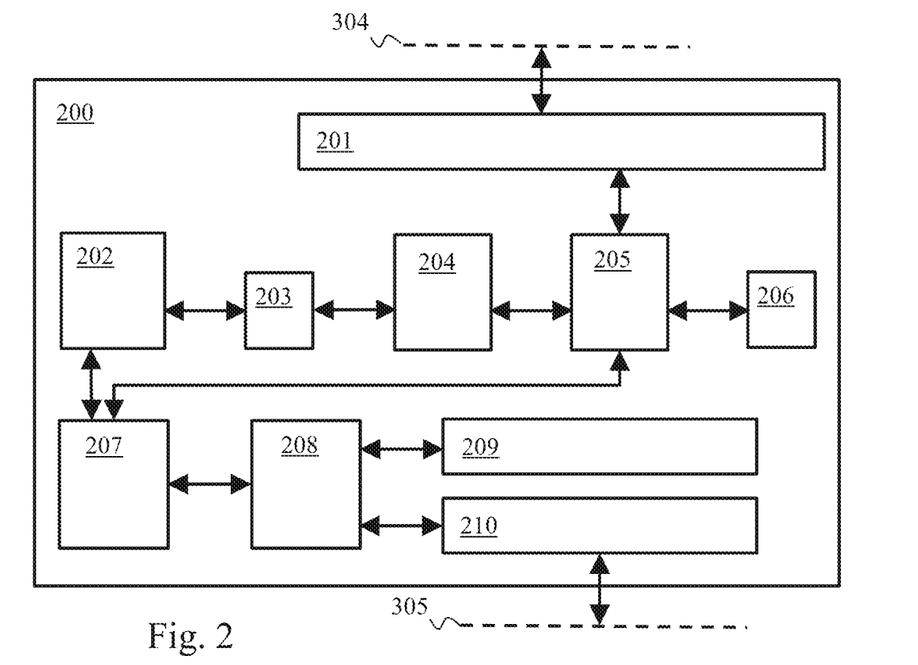
FIG. 2 schematically illustrates an architecture for a device for configuring the management system.

FIG. 2 schematically illustrates an architecture for a configuring device 200 of the management system 100.

The configuring device 200 enables a user to define management rules to be applied by the control unit 110. The configuring device 200 can be included in the control unit 110 or be separate therefrom. The first case is the one present in FIG. 2. In the second case, the control unit 110 comprises a memory for storing the rules supplied by the configuring device 200 and a rules engine to apply them. It should be noted that, in this second case, it is not necessary for the configuring device 200 to comprise a rules engine, since the configuring device 200 is only used for the purpose of defining management rules rather than for the purpose of applying them.

Figure 3:
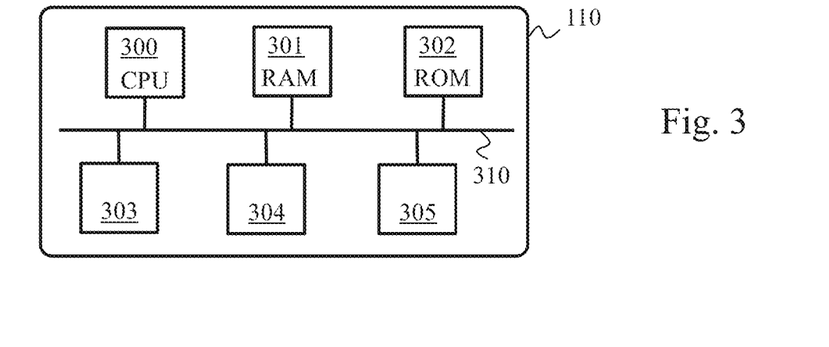
FIG. 3 schematically illustrates an architecture for a unit controlling the management system comprising the configuring device.

The configuring device 200 comprises a shaping module 210 intended to shape data received in the form of messages according to various protocols via a group of interfaces 305. The group of interfaces 305 is shown in FIG. 3 and corresponds to all the interfaces 111, 112, 113 of the control unit 110. This is because, to enable the user to define management rules, the configuring device 200 receives, coming from the appliances in the system 1001, descriptions of states in which these appliances are able to be, as well as descriptions of functions that these appliances are able to execute. Given that the configuring device 200 can receive these descriptions according to various protocols using various formats, the shaping module 210 transcribes the descriptions received into a same format. This enables the configuring device 200 to obtain descriptions of states and functions in a single format, independent of the communication technologies and protocols used. The shaping module 210 then simplifies the subsequent transcription of these descriptions of states and functions as semantic expressions. It should be noted that the configuring device 200 may not comprise the shaping module 210 when the appliances use the same communication protocol.

The shaping module 210 also receives notifications or events, coming from the appliances in the system 100, revealing changes in state of these appliances.

The configuring device 200 comprises a module 208 managing a list of all the appliances in the system 100 and the services that they offer. The configuring device 200 also comprises a list 209 of the appliances in the system 100, the states in which they are able to be and functions that they offer. The management module 208 is responsible for managing the list 209, according to information received from the shaping module 210. The management module 208 also invokes functions with the appliances of the system 100.

The configuring device 200 also comprises a module 207 for managing the actual states of the appliances in the system 100 and monitoring these states. The managing module 207 thus obtains a representation of the actual context of the system 100. This context representation is maintained by the managing module 207 according to the information supplied by the management module 208, and optionally by a rules engine 202 of the configuring device 200.

Figure 5:
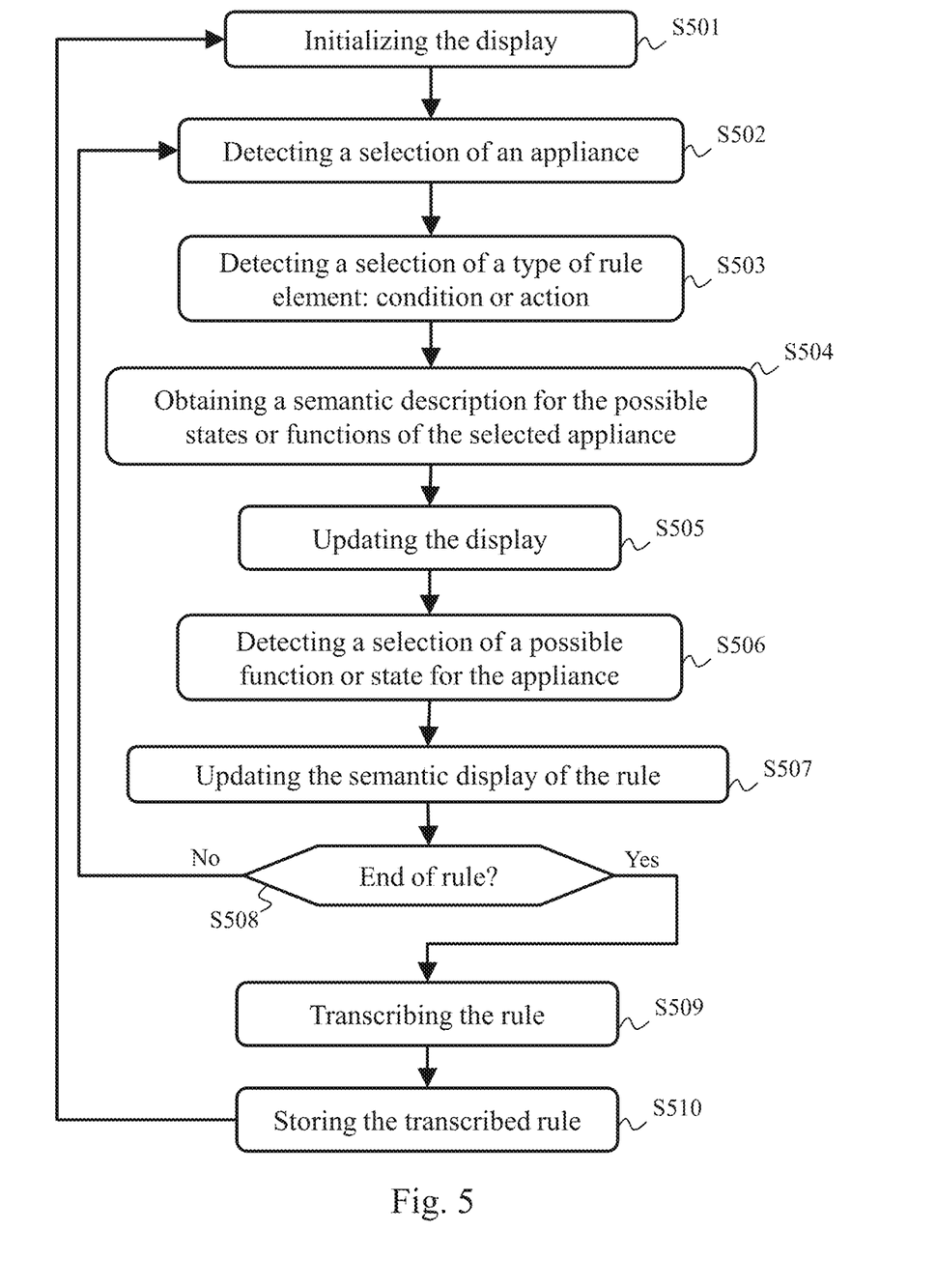
FIG. 5 schematically illustrates an algorithm implemented by the configuring device when a management rule to be applied by the management system is defined.

The rules engine 202 is responsible for applying the management rules, such as may be obtained by execution of the algorithm described hereafter in relation to FIG. 5. The rules engine 202 receives from the managing module 207 information with regard to the occurrence of events that imply changes in state of the appliances in the system 100. When a management rule condition is fulfilled following such a change in state, the rules engine 202 then requires the management module 208 to apply each action defined by this management rule, by invoking the appropriate functions of the concerned appliances.

The rules engine 202 is for example of the JRuleEngine type, in accordance with the document "JSR-94: Java Specification Request 94, version 1.1".

The configuring device 200 also comprises a rules base 203. Once a management rule is defined, it is stored in semantic form for subsequent display. This storage may be done in a dedicated storage unit (not shown in FIG. 2) or in the list 209 then extended to enable storing management rules in semantic form. The configuring device 200 also stores the management rule in the rules base 203, after transcription. This rules base 203 is then used by the rules engine 202 in order to determine, when a change in state occurs in the system 100, whether a management rule condition is fulfilled.

The configuring device 200 also comprises a rules transcriber 204. Once a management rule is defined, as described hereafter in relation to FIG. 5, the rules transcriber 204 transcribes the management rule, which is expressed in semantic form, into instructions interpretable by the rules engine 202. This transcription may be done using a look-up table (LUT). The rules transcriber 204 then stores the transcribed management rule in the rules base 203.

The configuring device 200 may also comprise a semantic database 206, which serves as a matching dictionary between, for each appliance according its type, each state or function and a corresponding semantic expression. The configuring device 200 may alternatively, or in addition to the semantic database 206, use a remote database (not shown) via a communications network. This facilitates the updating of the dictionary following the appearance of new appliances on the market.

The semantic database 206 preferentially comprises equivalent semantic expressions in several languages.

The configuring device 200 also comprises a rules editor 205. The rules editor obtains, for example via the managing module 207, a list of appliances in the system 100. It also obtains, for example via the managing module 207, a description of the states in which each appliance in the system 100 is able to be, as well as a description of each function that each appliance in the system 100 is able to execute. The rules editor 205 than transcribes these descriptions into semantic expressions, using the semantic database 206. This allows obtaining a description of the states and functions in natural language for the user. In addition, when the semantic database 206 comprises equivalent semantic expressions in several languages, the rules editor 205 allows performing the transcription according to a language chosen by the user.

In a particular embodiment, when a state or function is associated with at least one attribute that may take various values, the configuring device 200 transcribes the description of the state or function into semantic expressions according to these various values. For example, an appliance of the lamp type may be switched on according to several configurations: low intensity, medium intensity or high intensity. Two states may then be defined: "on" or "off", with, for the "on" state, an attribute representing the intensity. In the same way, this appliance may offer two functions "increase intensity" and "decrease intensity", each with an attribute representing the intensity to be reached by application of the function.

The configuring device 200 also comprises a user interface management module 201. The management module 201 is responsible for interfacing the rules editor 205 with a graphical interface module 304. The management module 201 thus enables the rules editor 205 to provide the semantic expressions of the states and functions to the graphical interface module 304. The management module 201 also enables the rules editor 205 to supply to the graphical interface module 304 the list of appliances in the system 100. The management module 201 also enables the user, via the graphical interface module 304, to define at least one management rule from at least one condition, on the basis of these semantic state expressions, and at least one action, on the basis of these semantic expressions of functions. The management module 201 then supplies each defined condition and action to the rules editor 205.

It should be noted that other architectures may enable implementing the configuring device 200 or the control unit 110. For example, it is possible to place the shaping module 210 and the group of interfaces 305 on a first platform and the other modules on a second platform. Each of these platforms then comprises a module for interfacing with the other platform enabling exchanges of the data necessary for the management of the appliances in the system 100. The interface between the two platforms can then be achieved by the use of web protocols, such as for example HTTP (Hyper Text Transfer Protocol) or SOAP (Simple Object Access Protocol).

Figure 4:
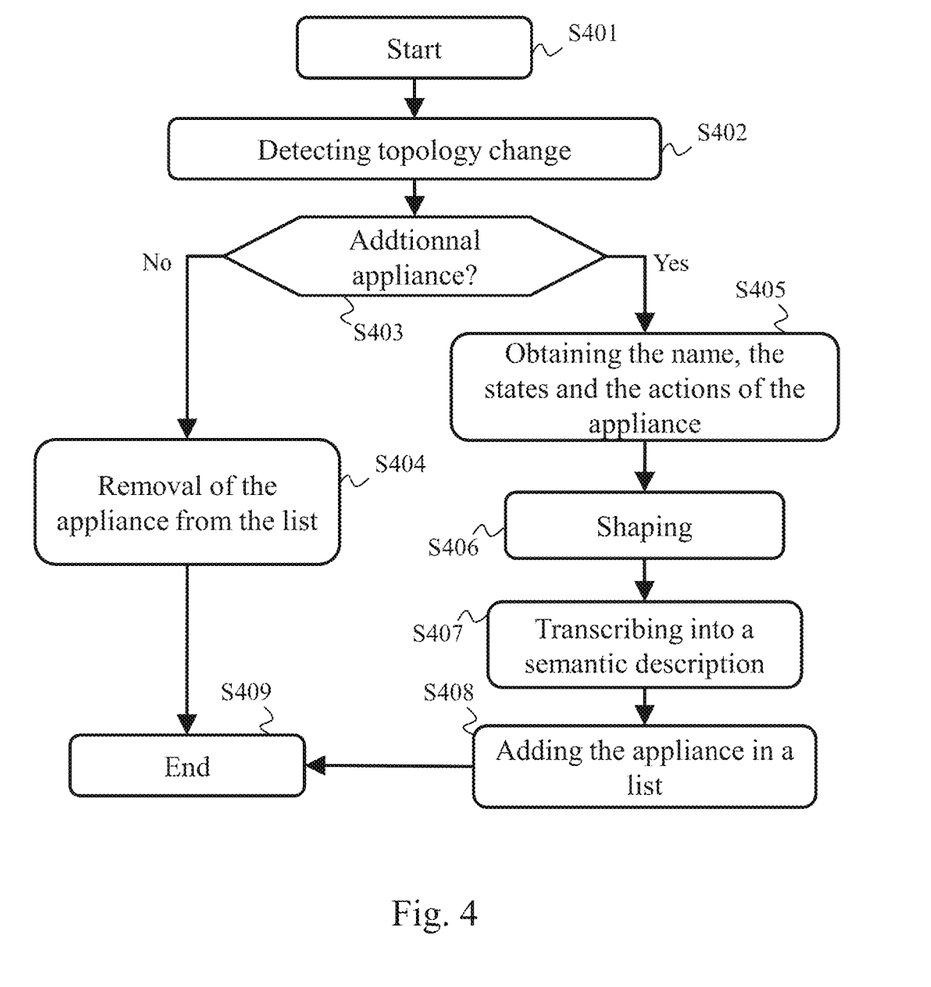
FIG. 4 schematically illustrates an algorithm implemented by the configuring device when a change in topology of the management system is detected.
Figure 6:
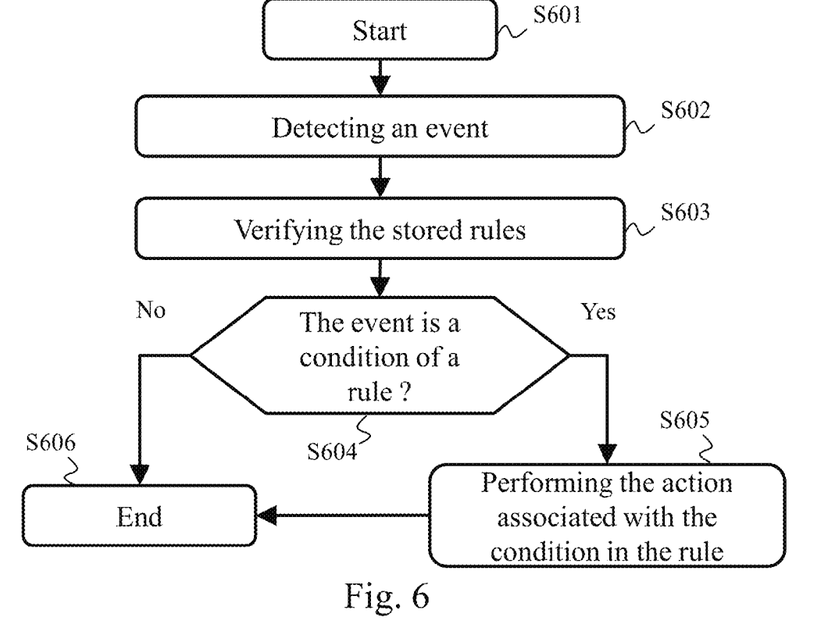
FIG. 6 schematically illustrates an algorithm implemented by the management system of FIG. 1 to apply a management rule.

All or part of the architecture presented in FIG. 2 and all or some of the algorithms described hereafter in relation to FIGS. 4 to 6 may then be implemented in software form by execution of a set of instructions by a programmable machine, such as a DSP (Digital Signal Processor), a microcontroller or a processor of the CPU (Central Processing Unit) type.

Alternatively, all or part of the architecture presented in FIG. 2 and all or some of the algorithms described hereafter in relation to FIGS. 4 to 6 may be implemented in hardware form by a dedicated machine or component, such as an FPGA (Field-Programmable Gate Array) or an ASIC (Application-Specific Integrated Circuit).

FIG. 3 schematically illustrates an architecture for the control unit 110 comprising the configuring device 200.

Figure 7:
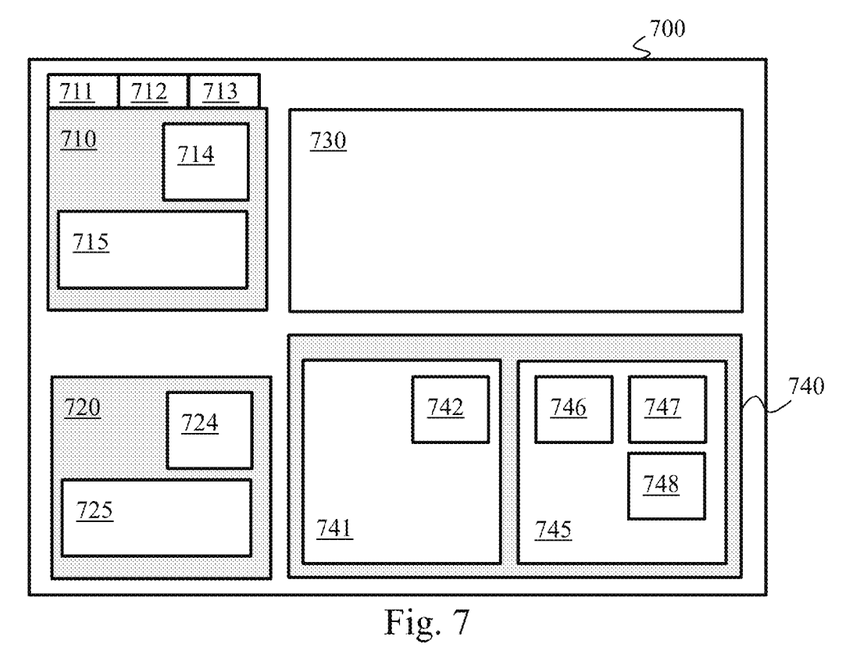
FIG. 7 schematically illustrates a graphical interface enabling a user to define a management rule to be applied by the management system.

The control unit 110 comprises, connected by a communication bus 310:
- a processor, microcontroller or CPU 300;
- a random access memory RAM 301;
- a read only memory ROM 302;
- a storage medium reader 303, such as an SD (Secure Digital) card reader;
- man-machine interface means, and more particularly a graphical interface module 304 for managing the display of a graphical interface 700, an example of which is illustrated hereafter in relation to FIG. 7;
- interface means 305 for communicating with the appliances in the system 100, comprising in particular the interfaces 111, 112, 113.

The CPU 300 is capable of executing instructions loaded in the RAM 301 from the ROM 302, an external memory (not shown), a storage medium, such as an SD card or the like, or a communications network. When the control unit 110 is powered up, the CPU 300 is capable of reading instructions from the RAM 301 and executing them. These instructions form a computer program that causes the implementation, by the CPU 300, of all or some of the algorithms described hereafter in relation to FIGS. 4 to 6.

FIG. 4 schematically illustrates an algorithm implemented by the configuring device 200, when a change in topology in the system 100 is detected. Such a change in topology occurs when an appliance is disconnected from the system 100, when an appliance is connected for the first time to the system 100 or when an appliance is reconnected to the system 100.

The algorithm starts in a step S401. In a following step S402, the configuring device 200 detects a change in topology in the system 100. In a following step S403, the configuring device 200 checks whether an appliance has been added to the system 100 compared with the context preceding the change in topology. If such is the case, a step S405 is performed; if not, a step S404 is performed.

During the step S404, the configuring device 200 determines which appliance has been disconnected from the system 100 and removes it from the list of appliances 209. The managing module 207 then updates the context information of the system 100. This information may be propagated to the rules editor 205 so that it enables the user interface to be updated accordingly. The algorithm is then ended in a step S409.

During the step S405, the configuring device 200 obtains the name of the appliance newly connected or reconnected to the system 100. It also obtains a description of the states in which this appliance is able to be and the functions that it is able to execute. For example, as already mentioned, a protocol based on the UPnP standard can be used for this purpose.

During a following step S406, the configuring device 200 performs a shaping of the obtained descriptions. Thus, when the configuring device 200 is adapted to receive descriptions of states and functions of the appliances according to various protocols using various formats, the configuring device 200 transcribes the received descriptions into a same format. It thus obtains homogeneous descriptions of the states and functions.

During a following step S407, the configuring device 200 transcribes the descriptions of the states and functions into respective semantic expressions, by means of the rules editor 205. The rules editor 205 thus enables the user interface to be updated accordingly.

During a following step S408, the configuring device 200 updates the list of appliances 209. Next, in the step S409, the algorithm is ended.

FIG. 5 schematically illustrates an algorithm implemented by the configuring device 200, during the definition of a management rule.

The algorithm starts in a step S504, during which the display of the graphical interface 700 is initialised. An example of such a graphical interface is described hereafter in relation to FIG. 7.

In a following step S502, the configuring device 200 detects a selection, by the user via the graphical interface 700, of an appliance in the system 100. This selection may be made by means of a pointer or a touch screen. Preferentially, the configuring device 200, via the graphical interface 700, displays representations of the appliances by groups established according to their geographical distribution and/or according to the services that they provide. For example, the graphical interface 700, from a list of appliances, indicates in which room in a dwelling each appliance is located and/or to which service, e.g. multimedia or home automation, each appliance relates. The configuring device 200 then stores this indication in the list of appliances 209.

In a following step S503, the configuring device 200 detects that a type of management rule element, i.e. condition or action, is selected for the appliance selected at the step S502. This selection may be made by drag and drop of an icon representing the appliance selected in a first zone 710 of the graphical interface 700, intended for defining the conditions of the management rule, or in a second zone 720 of the graphical interface 700 intended for defining the actions of the management rule.

In a following step S504, the configuring device 200 obtains a semantic description of the states in which the selected appliance is able to be or a description of the functions that it is able to execute. The description obtained depends on the type of management rule element, i.e. condition or action, selected at the step S503. The configuring device 200 then, in a following step S505, enables the display to be updated accordingly. Thus, the user obtains a display in the form of semantic expressions of the conditions or actions that he can use for defining the management rule on the basis of the selected appliance.

In a following step S506, the configuring device 200 detects a selection of a state or a function from those displayed during the step S505. A condition or action is thus defined. This means that the user has respectively selected a condition or an action for defining the management rule. In a following step S507, the configuring device 200 enables the display to be updated accordingly. A zone 730 of the graphical interface 700, intended to display the management rule currently being defined, then shows the condition or action in semantic form.

In a particular embodiment, the configuring device 200 displays a semantic expression corresponding to a name of the selected appliance associated with a semantic expression corresponding to a word representing the concerned state or action. Taking the example of the lamp already mentioned, "switched on" for a condition or "switch on the lamp" for an action.

Preferably, the configuring device 200 enables the automatic insertion, for the display of the management rule currently being defined, of semantic linking expressions on the basis of the condition or action. Taking the example of the lamp already mentioned, the display may result in "if the lamp is switched on" for a condition or "then switch on the lamp" for an action. Other semantic linking expressions can be inserted. For example, the configuring device 200 may enable defining several conditions for a same management rule. These conditions may be alternatives for triggering the action and, in this case, they are separated by the semantic expression "or"; they may on the other hand be cumulative and, in this case, they are separated by the semantic expression "and". Likewise, the configuring device 200 may enable defining several actions for a same management rule. In this case, the various actions are separated by the semantic expression "and".

In a following step S508, the configuring device 200 checks whether the definition of the rule is ended. If such is the case, a step S509 is performed; if not, the step S502 is reiterated.

In the step S509, the configuring device 200 stores the rule in its semantic form, for example in the list 209, and transcribes the management rule into instructions interpretable by the rules engine 202. In a following step S510 the configuring device 200 stores the transcribed management rule in the rules base 203. Next, a new management rule can be defined by reiterating the algorithm as from the step S501.

In a particular embodiment, the configuring device 200, via the graphical interface 700, enables several appliances to be selected during the step S502. It then enables associating a condition or action with all the appliances in this selection. Then, during the step S505, only the states or functions common to all the appliances in the selection are displayed. Preferentially, at the step S507, when the display of the management rule currently being defined is updated, a condition, or an action according to circumstances, is displayed for each appliance in the selection. This facilitates the subsequent transcription of the management rule into instructions interpretable by the rules engine 202.

In another particular embodiment, the configuring device 200 enables the user, via the graphical interface, to define at least one management rule condition on the basis of a time-stamping event. The system 100 then has a clock enabling the configuring device 200 to check whether the condition based on the time-stamping event is fulfilled.

For example, the user can define a condition with respect to a date, a given timetable at this date, a given timetable whatever the date, a day of the week, etc.

According to a variant embodiment, the configuring device 200 enables the user, via the graphical interface, to define at least one management rule condition on the basis of an event of activation of a user profile with the system 100. Radio Frequency Identification (RFID) technology may be used for this purpose. It enables storing data on RFID tags. ISO 14443 A & B may for example be implemented. Thus, a user may activate his profile by placing the RFID tag that identifies him close to a corresponding reader. In the same way, a user having a terminal equipped with NFC (Near Field Communication) technology, such as a mobile telephone, can exchange information identifying him with respect to the system 200 equipped with the corresponding reader, using his NFC terminal in peer-to-peer mode or tag emulation. Other techniques may be used for detecting the activation of a user profile with the system 100. For example, Bluetooth (registered trademark) technology as defined in IEEE 802.15.1 may be used for detecting that the mobile telephone or the personal digital assistant (PDA) of a particular user is present in the coverage area of the system 100.

In one example embodiment, the user may then define a condition relating to his presence or absence in the premises in which the system 100 is installed.

The conditions defined on the basis of time-stamping events or events of activation of a user profile may be combined with each other and/or combined with at least one state condition of an appliance in the system 100 in order to define the management rule.

FIG. 6 schematically illustrates an algorithm used by the control unit 110 for applying a management rule as defined by execution of the algorithm in FIG. 5.

The algorithm starts in a step S601. In a following step S602, the control unit 110 detects an event. This event may relate to a change in state of an appliance in the system 100, or be a time-stamping event or an event of activation of a user profile as mentioned above.

In a following step S603, the control unit 110 performs a step of checking the management rules that were previously defined. More particularly, the rules engine 202 parses the rules base 203. In a following step S604, the control unit 110 checks whether the detected event corresponds to a condition of a previously defined management rule. If such is the case, a step S605 is performed; otherwise the algorithm is ended in a step S606.

This operation of the system with a rules engine in forward chaining may apply with a rules engine in backward chaining, that is to say an engine that checks that, for a given purpose, the conditions are established.

In the step S605, the control unit 110 performs the action defined in the management rule for which the condition, or set of conditions, is fulfilled. More particularly, the rules engine 202 instructs the management module 208 to invoke each function corresponding to the action or actions defined in the management rule. The algorithm is then ended during the step S606.

FIG. 7 schematically illustrates an example of a graphical interface 700 that enables the user to define a management rule.

The graphical interface 700 comprises zones already mentioned: the zone 710 that is intended for defining the conditions of the management rule; the zone 720 that is intended for defining the actions of the management rule; and, the zone 730 that is intended for displaying the management rule currently being defined.

The graphical interface 700 also comprises a zone 740 that is intended for displaying icons 742, 746, 747, 748 representing appliances in the system 100 that may be the subject of a condition or action. The zone 740 may comprise several subzones 741, 745 in order to display the icons 742, 746, 747, 748 according to a geographical distribution of the appliances in the system 100 and/or according to services provided by these appliances.

The zone 710 comprises a subzone 714 for dropping an icon 742, 746, 747, 748 representing an appliance in the system 100. When the user performs a click and drop of the icon 742, 746, 747, 748 in the zone 714, another subzone 715 of the zone 710 is updated with a semantic description of each state in which the appliance concerned may be. This subzone 715 enables the user to make his choice among the states for adding one or more conditions to the management rule currently being defined.

The zone 710 also comprises at least one condition-validation button (not shown) that enables selecting a condition for defining the management rule. In a preferred embodiment, the zone 710 comprises two validation buttons: a first button for adding a condition alternative to another condition of the management rule currently being defined, and a second button for adding a condition cumulative to another condition of the management rule currently being defined.

The zone 720 comprises a subzone 724 for dropping an icon 742, 746, 747, 748 representing an appliance in the system 100. When the user performs a click and drop of the icon 742, 746, 747, 748 in the zone 724, another subzone 725 of the zone 720 is updated with a semantic description of the functions offered by the appliance concerned. This subzone 725 enables the user to make his choice among these functions for adding one or more actions to the management rule currently being defined.

The zone 720 also comprises an action validation button (not shown) that enables selecting an action for defining the management rule. If an action is already present in the management rule currently being defined, the validation action is added cumulatively to the one already present.

The graphical interface 700 may also comprise tabs 711, 712, 713 that are activated exclusively. The tab 711 is intended to activate the zone 710 to define a condition relating to a state of an appliance, or a selection of several appliances, of the system 100. The tab 712 is intended to activate the zone 710 in order to define a condition relating to a time-stamping event. The tab 713 is intended to activate the zone 710 in order to define a condition relating to a user profile activation.

The graphical interface 700 may also enable selecting several appliances in the zone 740, and making a simultaneous drag and drop of the icons representing these appliances in one of the subzones 714 and 724. In this case, the subzones 715 and 725 are respectively updated by the configuring device 200 with the semantic expressions of the states and functions that are common to the selected appliances.

The graphical interface 700 may also comprise a language selection menu. Thus the user can choose a language from a set offered by the configuring device 200 via the graphical interface 700. The configuring device 200 then transcribes the descriptions of the states and functions into semantic expressions in the selected language. In addition, when it automatically inserts linking semantic expressions, the configuring device 200 does so in the selected language.

The graphical interface 700 also comprises a management rule validation button (not shown) that validates the management rule displayed in the zone 730. The management rule is then stored in its semantic form, for example in the list 209, and transcribed into instructions interpretable by the rules engine 202, as previously described in relation to FIG. 5.

The user interface may also be multimode, and use a combination of graphical and voice inputs and outputs. The system may rely on the semantic terms covering the equipment and its functions and states in order to define a dictionary of words that are preferably recognised by a voice recognition engine. Thus a user may speak in order to dictate a rule to the system, which then relies on the semantic dictionary to establish a multi-user voice recognition. In return, when a rule is stated, the system may display, via the graphical interface element 730, the semantic rule recognised by the system.

The user interface may also be solely of the voice type. The definition of the management rule is then done by voice recognition and the broadcasting of information relating to the appliances in the system 100, semantic expressions corresponding to the states and functions and the management rule currently being defined is done by voice synthesis rather than by display.

The invention claimed is:

1. A configuring method for managing appliances in a system on the basis of management rules defining at least one action to be executed by said system when at least one condition is fulfilled, said system comprising a rules engine intended to implement said management rules, the method comprising a configuring device:

supplying semantic expressions of states and functions to a user interface;

enabling a user, via the user interface, to define at least one management rule from at least one condition, on the basis of the semantic expressions of states, and at least one action, on the basis of the semantic expressions of functions;

transcribing each management rule, defined semantically via the user interface, into instructions interpretable by the rules engine;

wherein the configuring device:

obtains a description of states in which each appliance in the system is able to be;

obtains a description of functions that each appliance in the system is able to execute; and transcribes said descriptions of states and functions into respective semantic expressions for supplying said semantic expressions of states and functions to the user interface so that the user can understand.

2. The configuring method according to claim 1, wherein, when a state or function is associated with at least one attribute that may take various values, using the configuring device to transcribe the description of the state or function into semantic expressions according to said various values.

3. The configuring method according to claim 1, comprising using the configuring device to transcribe said descriptions of the states and functions into semantic expressions in a predetermined language from a choice of several languages available via the user interface.

4. The configuring method according to claim 1, comprising using the configuring device to transcribe said descriptions of the states and functions into semantic expressions by the use of at least one dictionary for matching, for each appliance according to its type, between each state or function and a corresponding semantic expression.

5. The configuring method according to claim 1, comprising using the configuring device to enable the user, via the user interface, to define at least one management rule condition on the basis of a time-stamping event or of an event of activation of a user profile with said system.

6. The configuring method according to claim 1, comprising using the configuring device to enable broadcasting via the user interface of a management rule currently being defined, and using the configuring device to enable broadcasting via the user interface, for each appliance to which a defined condition or action relates, of a semantic expression corresponding to a name of said appliance associated with a semantic expression corresponding to a word representing the state or function to which said defined condition or action respectively relates.

7. The configuring method according to claim 6, comprising using the configuring device to allow the automatic insertion, for display of the management rule currently being defined, of linking semantic expressions on the basis of each defined condition or action.

8. The configuring method according to claim 6, comprising using the configuring device to enable, via the user interface, a selection of several appliances, and to enable associating a condition or action with this selection of appliances.

9. The configuring method according to claim 1, wherein, the user interface is being a graphical interface, and comprising using the configuring device to allow, via the graphical interface, the display of representations of said appliances by groups established according to a geographical distribution of said appliances and/or according to services provided by said appliances.

10. The configuring method according to claim 1, comprising using the configuring device to receive descriptions of states and functions of the appliances according to various protocols using various formats, and to transcribe in a same format the received descriptions in order to obtain said descriptions of states and functions.

11. A configuring device for managing appliances in a system on the basis of management rules defining at least one action to be executed by said system when at least one condition is fulfilled, said system comprising a rules engine intended to implement said management rules, the configuring device comprising:

means for supplying semantic expressions of states and functions to a user interface;

means for enabling a user, via the user interface, to define at least one management rule from at least one condition, on the basis of the semantic expressions of states, and at least one action, on the basis of the semantic expressions of functions;

means for transcribing each management rule, defined semantically via the user interface, as instructions interpretable by the rules engine;

wherein the configuring device further comprises:

means for obtaining a description of states in which each appliance in the system is able to be;

means for obtaining a description of functions that each appliance in the system is able to execute; and means for transcribing said descriptions of states and functions as respective semantic expressions for supplying said semantic expressions of states and functions to the user interface.

12. The configuring device according to claim 11, wherein the configuring device comprises:

a group of interfaces;

a shaping module transcribing in a same format the descriptions of states and the descriptions of functions, when said descriptions are received according to various protocols via said group of interfaces;

a module managing a list of said appliances;

a module managing actual states of said appliances intended to supply to the rules engine information as to the occurrence of events implying changes in state of said appliances;

an access to a semantic database providing a match between, for each appliance according to its type, each state or function and a corresponding semantic expression; and a rules editor adapted to transcribe said descriptions of the states and functions as respective semantic expressions, by means of said semantic database.

13. A storage means for storing a computer program comprising instructions for implementing, by means of a configuring device, the method according to claim 1, when said program is executed by a processor of said configuring device.

14. A device comprising hardware configured to display a graphical interface for defining management rules for managing appliances in a system, each management rule defining at least one action to be executed by said system when at least one condition is fulfilled, wherein the device comprises a graphical interface module configured to:

display a first display zone intended to display representations of said appliances and to enable a user to select at least one of said appliances;

display a second display zone intended to display semantic expressions representing respective states in which at least one selected appliance is able to be and to enable a user to make a selection;

display a third display zone intended to display semantic expressions representing functions that at least one selected appliance is able to execute;

display a fourth display zone intended to display a management rule currently being defined;

and wherein said second and third display zones are adapted to enable a user to define at least one management rule from at least one condition, on the basis of the semantic expressions of states displayed in the first display zone, and at least one action, on the basis of the semantic expressions of functions displayed in the second display zone.

* * * * *